(12) United States Patent
Sivakumar et al.

(10) Patent No.: US 12,437,235 B2
(45) Date of Patent: Oct. 7, 2025

(54) AUTO SAMPLING IN INTERNET-OF-THINGS ANALYTICS SYSTEM VIA CACHED RECYCLE BINS753634

(71) Applicant: International Business Machines Corporation, Armonk, NY (US)

(72) Inventors: Gandhi Sivakumar, Bentleigh (AU); Kushagra Manglik, Lucknow (IN); Vijay Ekambaram, Chennai (IN); Luke Peter Macura, Lucas (AU)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 17/536,336

(22) Filed: Nov. 29, 2021

(65) Prior Publication Data
US 2023/0169390 A1    Jun. 1, 2023

(51) Int. Cl.
G06N 20/00 (2019.01)
G06N 20/20 (2019.01)
G06N 3/08 (2023.01)

(52) U.S. Cl.
CPC .............. *G06N 20/00* (2019.01); *G06N 20/20* (2019.01); *G06N 3/08* (2013.01)

(58) Field of Classification Search
CPC ........ G06N 20/00; G06N 20/10; G06N 3/044; G06N 3/045; G06N 3/084; G06N 3/049;
(Continued)

(56) References Cited

U.S. PATENT DOCUMENTS

| 9,172,738 B1 | 10/2015 | Dacosta |
| 10,122,806 B1 | 11/2018 | Florissi |

(Continued)

FOREIGN PATENT DOCUMENTS

| CA | 3078842 C | * | 1/2024 |
| CN | 101539241 B | * | 7/2012 |

(Continued)

OTHER PUBLICATIONS

Giouroukis et al., "A Survey of Adaptive Sampling and Filtering Algorithms for the Internet of Things," DEBS '20: 14th ACM International Conference on Distributed and Event-Based Systems, Jul. 2020, Montreal, Canada, 14 pages.
(Continued)

*Primary Examiner* — Steven P Sax
(74) *Attorney, Agent, or Firm* — Elliot J. Shine

(57) ABSTRACT

An approach is provided in which the approach stores, in a cached recycle bin, a set of sensor data that is sent from a sensor at a transmit frequency. The approach samples at least a portion of the set of sensor data from the cached recycle bin based on a sampling frequency and training a machine learning model using the sampled data. In response to detecting that a performance of the machine learning model falls below a threshold during the training, the approach adjusts the sampling frequency and re-sampling at least a portion of the sensor data based on the adjusted sampling frequency. The approach instructs the sensor to adjust the transmit frequency in response to determining that the performance of the machine learning model reaches the threshold using the re-sampled data.

11 Claims, 11 Drawing Sheets

(58) Field of Classification Search
CPC ... G06N 3/08; G06F 11/3072; G06F 11/2263; G06F 9/5038; H04L 67/1095; H04L 67/568; H04W 4/70; G06Q 50/163
See application file for complete search history.

(56) References Cited

U.S. PATENT DOCUMENTS

| | | | |
|---|---|---|---|
| 10,185,934 B2 | 1/2019 | Gupta | |
| 10,277,682 B2 | 4/2019 | Biswas | |
| 2010/0185416 A1* | 7/2010 | Furem | E02F 9/267 702/182 |
| 2016/0292608 A1* | 10/2016 | Yin | G06Q 10/06315 |
| 2017/0196497 A1* | 7/2017 | Ray | G06N 7/01 |
| 2018/0284741 A1 | 10/2018 | Cella | |
| 2019/0064004 A1* | 2/2019 | Brady | G01K 17/20 |
| 2020/0065630 A1* | 2/2020 | Cmielowski | G06F 18/2178 |
| 2020/0322703 A1* | 10/2020 | Bures | G06F 16/27 |
| 2020/0408194 A1* | 12/2020 | Zen | F03D 7/045 |
| 2021/0133577 A1* | 5/2021 | Srinivasan | G06N 20/00 |
| 2021/0250342 A1* | 8/2021 | Budman | G06N 7/01 |
| 2021/0254979 A1* | 8/2021 | Faragher | G01C 21/1652 |
| 2021/0353236 A1* | 11/2021 | Kane | A61B 5/746 |
| 2021/0357767 A1* | 11/2021 | Fuerst | G06N 5/022 |
| 2021/0382469 A1* | 12/2021 | Zhou | G05B 23/024 |
| 2022/0124454 A1* | 4/2022 | Lewin | H04W 4/027 |
| 2022/0358749 A1* | 11/2022 | Yonetani | G06N 3/08 |
| 2023/0228618 A1* | 7/2023 | Xiong | G01H 17/00 73/649 |
| 2023/0229963 A1* | 7/2023 | Iyer | G06N 20/00 706/12 |

FOREIGN PATENT DOCUMENTS

| | | | | |
|---|---|---|---|---|
| CN | 107154003 A | * | 9/2017 | G06F 16/21 |
| CN | 110430229 A | * | 11/2019 | G06F 9/5038 |
| CN | 111622815 A | * | 9/2020 | |
| CN | 111651312 B | * | 3/2021 | G06F 11/2263 |
| CN | 113556366 A | * | 10/2021 | |
| CN | 113723773 A | * | 11/2021 | G06F 16/2462 |
| CN | 115958996 A | * | 4/2023 | |
| CN | 113591363 B | * | 12/2023 | G06F 30/25 |
| CN | 114166846 B | * | 8/2024 | G01N 21/8851 |
| EP | 4553709 A1 | * | 5/2025 | G16H 40/40 |
| JP | 7595319 B2 | * | 12/2024 | G06F 18/20 |
| KR | 20230109663 A | * | 7/2023 | |
| WO | WO-2020227429 A1 | * | 11/2020 | G06Q 10/20 |
| WO | WO-2022070073 A2 | * | 4/2022 | B25J 9/1689 |

OTHER PUBLICATIONS

Ghosh et al., "Deep Learning: Edge-Cloud Data Analytics for IoT," IEEE Canadian Conference of Electrical and Computer Engineering (CCECE), Edmonton, AB, Canada, May 2019, 7 pages.

Soldatos et al., "Development Tools for IoT Analytics Applications," riverpublishers.com, Athens Information Technology, Greece, 2017, 18 pages.

Kulau et al., "Dynamic Sample Rate Adaptation for Long-Term IoT Sensing Applications," 2016 IEEE 3rd World Forum on Internet of Things (WF-IoT), Dec. 2016, Reston, VA, 6 pages.

Stafford, "GTM Stack: IoT Data Analytics at the Edge," ITNEXT, Oct. 2020, 20 pages.

Schultze-Kraft, "Preprocessing IoT Data: Linear Resampling," Towards DataScience, Jul. 2017, 8 pages.

* cited by examiner

AUTO SAMPLING IN INTERNET-OF-THINGS ANALYTICS SYSTEM VIA CACHED RECYCLE BINS753634

BACKGROUND

Internet of things (IoT) describes physical objects or groups of objects that are embedded with sensors, processing ability, software, and other technologies, which connect and exchange data with other devices and systems over the Internet or other communications networks. The field of IoT has evolved due to the convergence of multiple technologies, including ubiquitous computing, commodity sensors, increasingly powerful embedded systems, and machine learning.

Traditional fields of embedded systems, wireless sensor networks, control systems, automation (including home and building automation), independently and collectively enable Internet of Things technology. IoT devices can be used to monitor and control mechanical, electrical, and electronic systems used in various types of buildings (e.g., public and private, industrial, institutions, or residential) in-home automation, and building automation systems.

IoT analytics applies data analysis tools and procedures to realize value from the large amount of data generated from connected Internet of Things devices. Today's IoT analytics configure machine learning models that process sampled data in the background to forecast for an event 'X' and trigger an alert when the IoT analytics detect an anomaly.

BRIEF SUMMARY

According to one embodiment of the present disclosure, an approach is provided in which the approach stores, in a cached recycle bin, a set of sensor data that is sent from a sensor at a transmit frequency. The approach samples at least a portion of the set of sensor data from the cached recycle bin based on a sampling frequency and training a machine learning model using the sampled data. In response to detecting that a performance of the machine learning model falls below a threshold during the training, the approach adjusts the sampling frequency and re-sampling at least a portion of the sensor data based on the adjusted sampling frequency. The approach instructs the sensor to adjust the transmit frequency in response to determining that the performance of the machine learning model reaches the threshold using the re-sampled data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
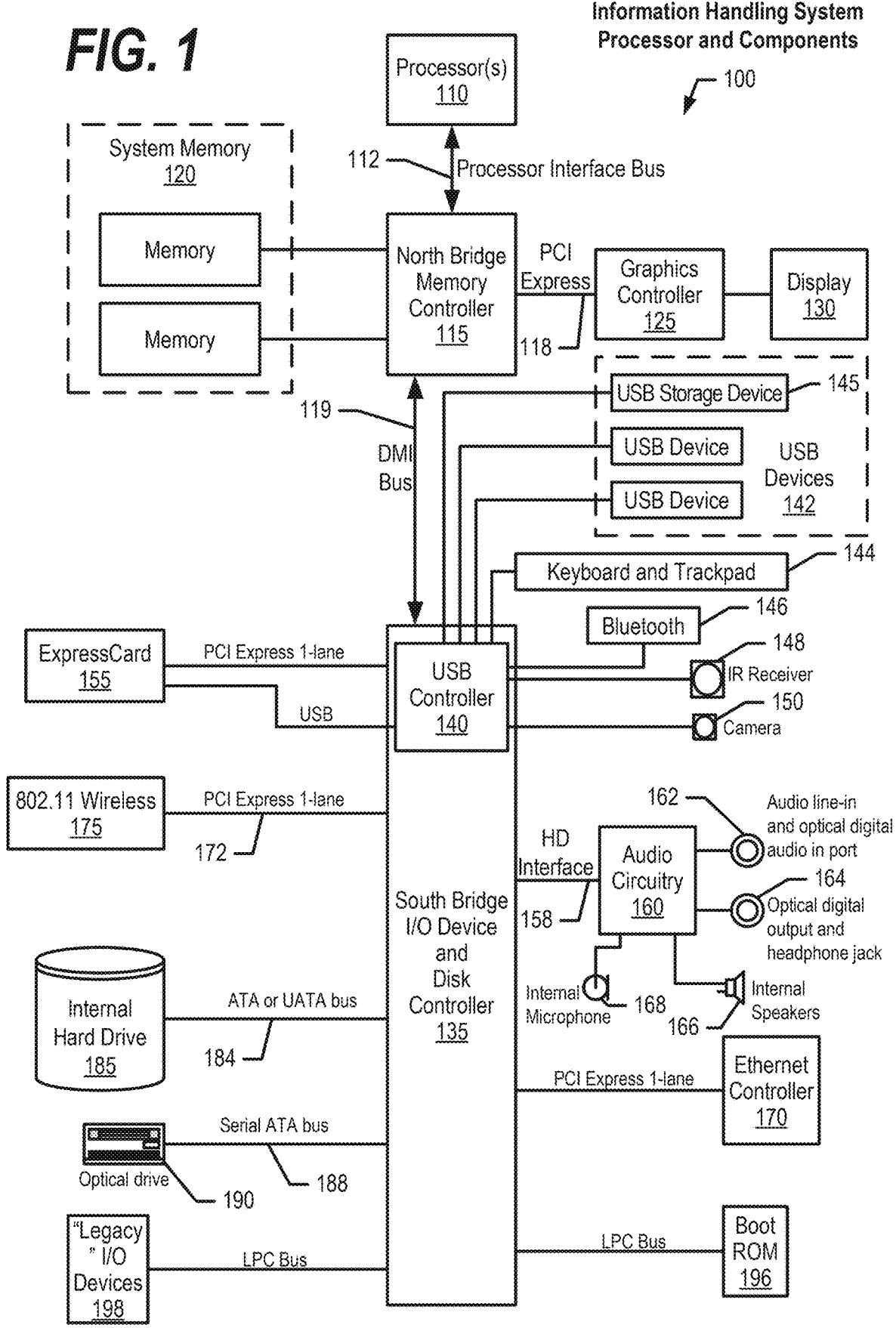
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112.

Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
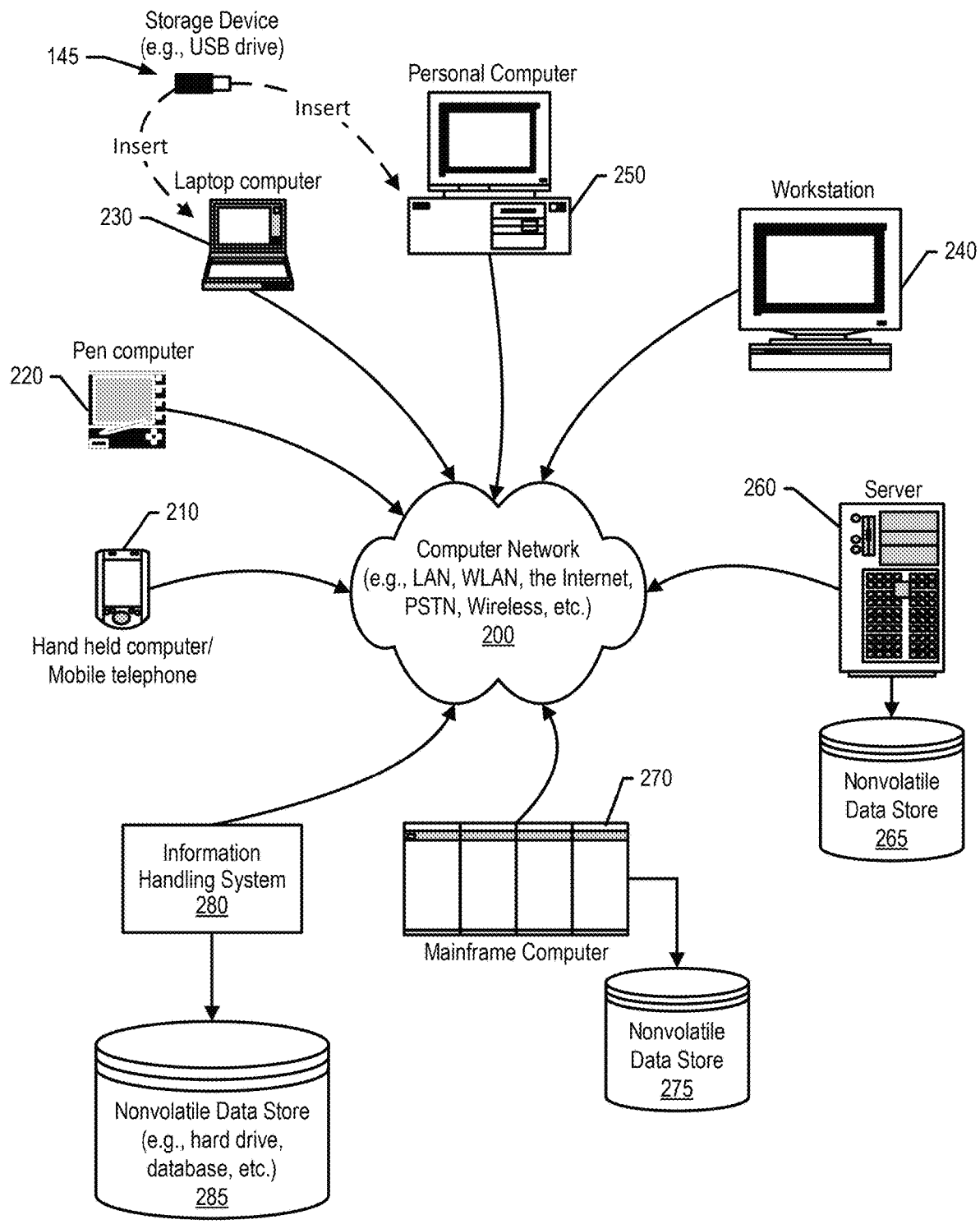
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, today's IoT analytics configure machine learning models that process sampled data in the background to forecast for an event 'X' and trigger an alert when the IoT analytics detect an anomaly. The machine learning models are dependent upon various parameters that, in turn, depend on sampling frequencies of each of the parameters. A challenge found is that the machine learning models tend to provide different accuracies for different sets of sampling frequencies. In addition, while trying to find an optimal set of sampling frequencies, the IoT analytics system continuously sends instructions to the sensors to adjust their transmit frequencies (e.g., sending frequencies) to arrive at an optimal solution. This looping process often leads to increases in power and network bandwidth consumption due to unnecessary momentary increases in transmit frequencies at the sensor.

FIGS. 3 through 11 depict an approach that can be executed on an information handling system that uses a model agnostic system and method for automatic upsampling and downsampling of IoT sensor data using cached recycle bins to minimize sampling adjustment instructions sent to the sensors. In turn, the approach discussed herein reduces network bandwidth over traditional systems that are historically consumed in continuous transmission of real time adjustment instructions to the sensors.

In one embodiment, the approach uses an IoT analytics engine with the cached recycled bins that is pluggable into machine learning model systems (e.g., as black box). In this embodiment, the cached recycle bins collect and analyze un-used data of the machine learning algorithms that, in turn, the IoT analytics engine uses to automatically downsample the IoT sensor transmit frequencies. When the machine learning model auto-tunes its hyper parameters, the IoT analytics engine automatically changes the distribution of the waste data collected in the cached recycle bin, which is tracked and monitored. Model parameters are tuned once the distribution of the waste data reaches a steady state and the underlying learning algorithm reaches a high accuracy for a particular downsampled frequency in steady state. In turn, the IoT analytics engine auto-signals the corresponding IoT sensors to downsample based on the new configuration settings.

In another embodiment, the approach enables automated model-agnostic upsampling and fractional-down sampling of the IoT sensor signals using the cached recycle bins fused with a finite impulse response (FIR) interpolator. In this embodiment, the approach determines an optimal sampling frequency by inserting zero values (zero stuffing) corresponding to sampling times for which no data exists in the recycle bins. By fusing the FIR interpolator with the recycle bins, the approach improves conventional 2-step techniques that express a chosen sampling frequency as a fraction of a current sampling frequency, and then decompose the fraction into a pure downsampling step followed by a pure upsampling step.

Figure 3:
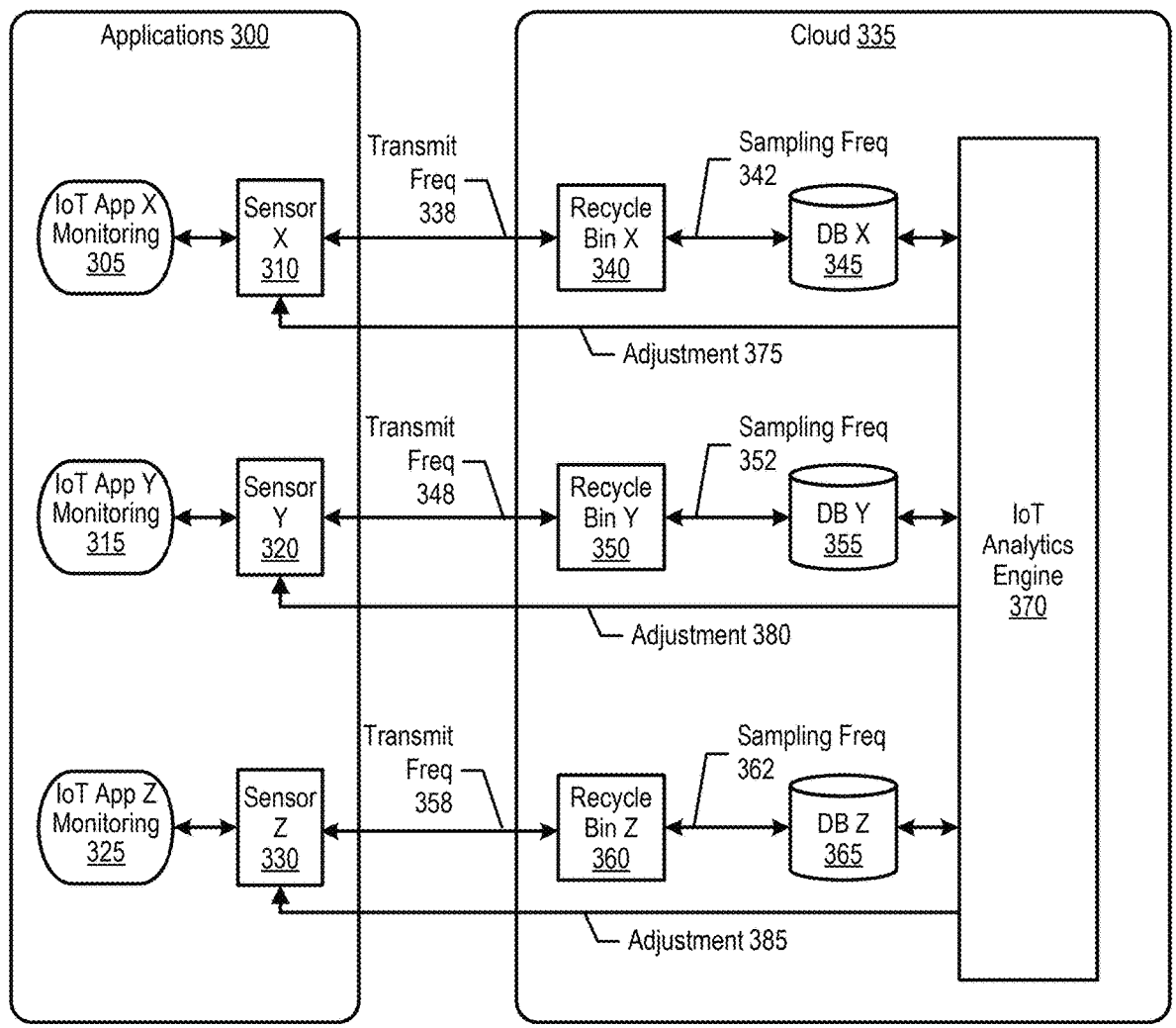
FIG. 3 is an exemplary diagram depicting an IoT analytics engine using cached recycle bins for dynamic auto sampling adjustments.

FIG. 3 is an exemplary diagram depicting an IoT analytics engine using cached recycle bins for dynamic auto sampling adjustments. Applications 300 include multiple IoT monitoring capabilities 305, 315, 325 and corresponding sensors 310, 320, and 330.

During upstream data transmissions, sensors 310, 320, and 330 transmit information to cloud 335 at various transmit frequencies 338, 348, and 358. Transmit frequencies 338, 348, and 358 may be at different frequencies or at the same frequency. Cloud 335 includes corresponding cached recycle bins 340, 350, and 360, which store transmit data received from their corresponding sensors in various storage partitions based on their corresponding transmit frequency (see FIGS. 7, 10, 11, and corresponding text for further details).

Cloud 335 includes databases 345, 355, 365, and IoT analytics engine 370. Databases 345, 355, and 365 sample data from recycle bins 340, 350, and 360 at their corresponding sampling frequencies 342, 352, and 362. IoT analytics engine 370 runs in the background and uses data from databases 345, 355, and 365 to learn a machine learning model, which is used to forecast for a given event 'X' and raise a flag in case of an anomaly. During this process, in one embodiment, IoT analytics engine 370 performs downsampling steps using the recycle bins as discussed herein until a suitable set of sampling frequencies is determined to provide stable accuracy. IoT analytics engine 370 then instructs the sensors to retune their transmit frequencies accordingly (adjustments 375, 380, 385).

In one embodiment, IoT analytics engine 370 uses a FIR interpolator in conjunction with the recycle bins to perform automated model-agnostic up-sampling and fractional-down sampling adjustments. In this embodiment, IoT analytics engine 370 bypasses a conventional two step procedure of expressing chosen sampling frequencies as a fraction of current sampling frequency and decomposing the fraction into pure downsampling followed by pure upsampling. Instead, IoT analytics engine 370 replaces the two step procedure by a single step by coupling the FIR interpolator with recycle bins 340, 350, and 360 (see FIGS. 8-11 and corresponding text for further details).

Figure 4:
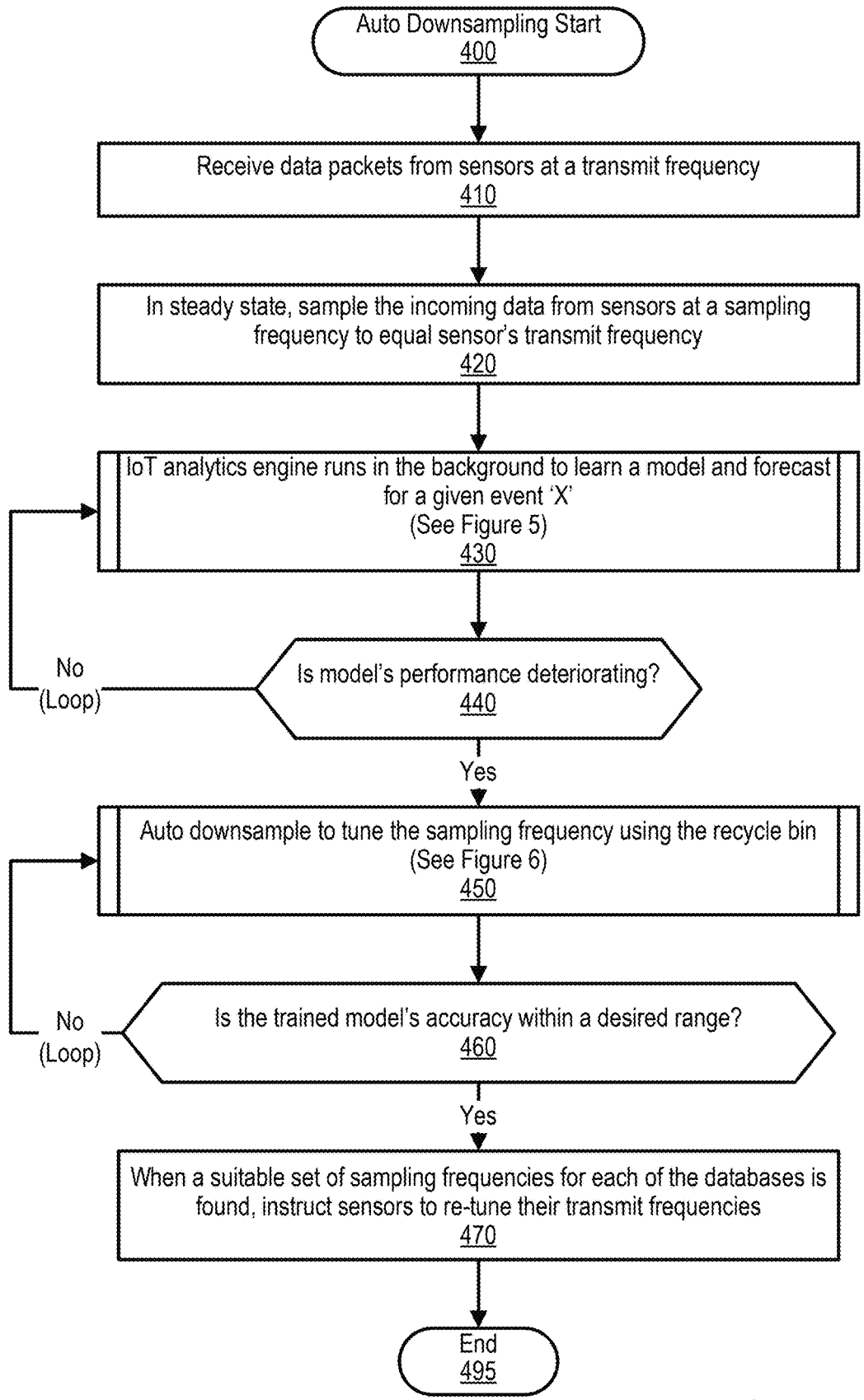
FIG. 4 is an exemplary flowchart depicting steps taken to auto downsample an IoT analytics system via cached recycle bins.

FIG. 4 is an exemplary flowchart depicting steps taken to auto downsample an IoT analytics system via cached recycle bins. FIG. 4 processing commences at 400 whereupon, at step 410, the process receives data packets from sensors (e.g., sensor X 310, sensor Y 320, sensor Z 330) at a certain rate (transmit frequency). At step 420, the process samples the sensor data from the database at a certain sampling frequency to equal the sensor's transmit frequency.

Figure 5:
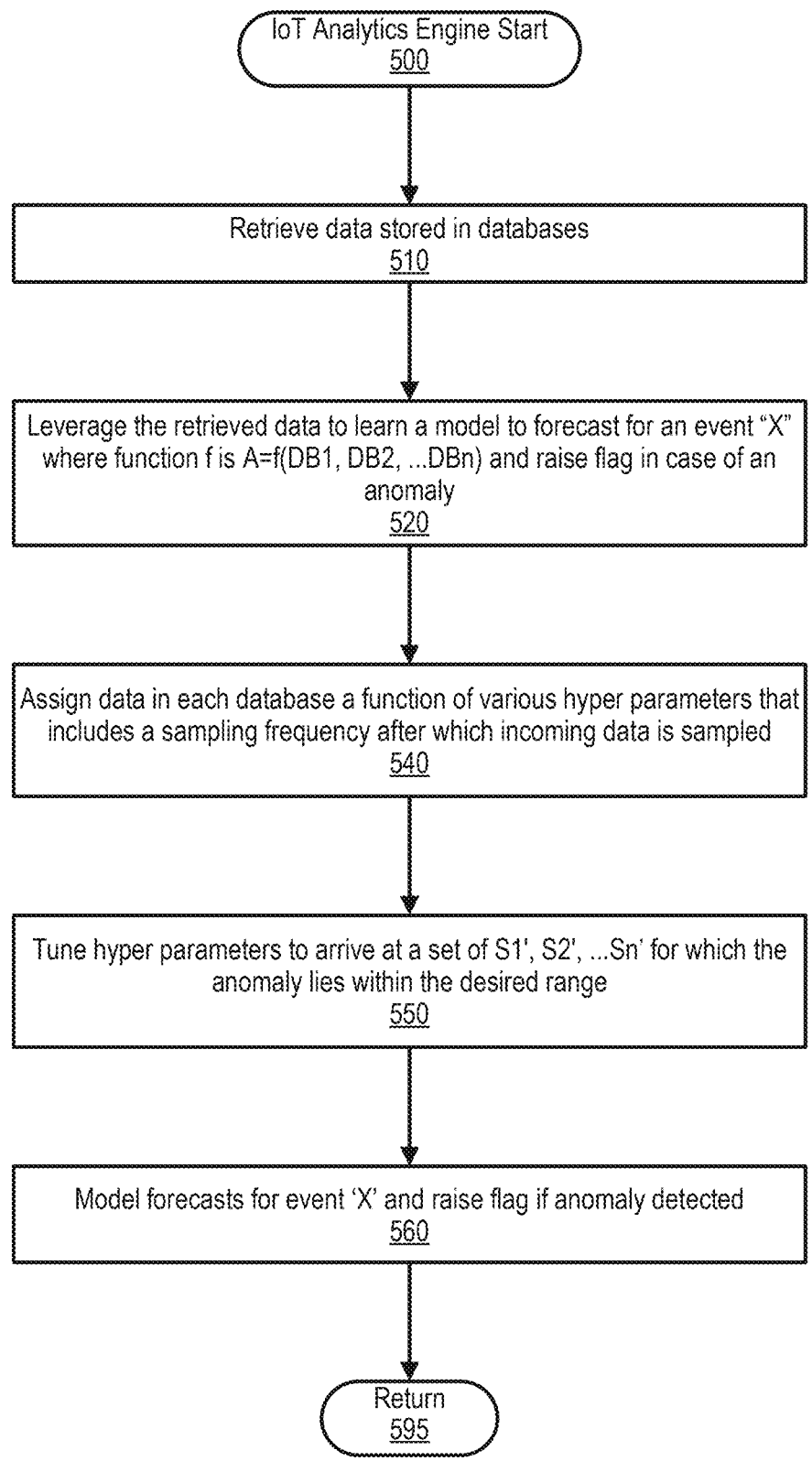
FIG. 5 is an exemplary flowchart depicting steps taken by an IoT analytics engine to learn a model and forecast for an event.

At predefined process 430, the process runs in the background to learn a machine learning model and forecast for a given event "X" (see FIG. 5 and corresponding text for processing details). The process determines as to whether the machine learning model's performance is deteriorating (decision 440). In one embodiment, the process determines whether the model is deteriorating by periodically checking its accuracy on a few validation datasets. If the model's performance is not deteriorating, then decision 440 branches to the 'no' branch which loops back to continue to learn the model and forecast accordingly. This looping continues until the model's performance deteriorates, at which point decision 440 branches to the 'yes' branch exiting the loop.

Figure 6:
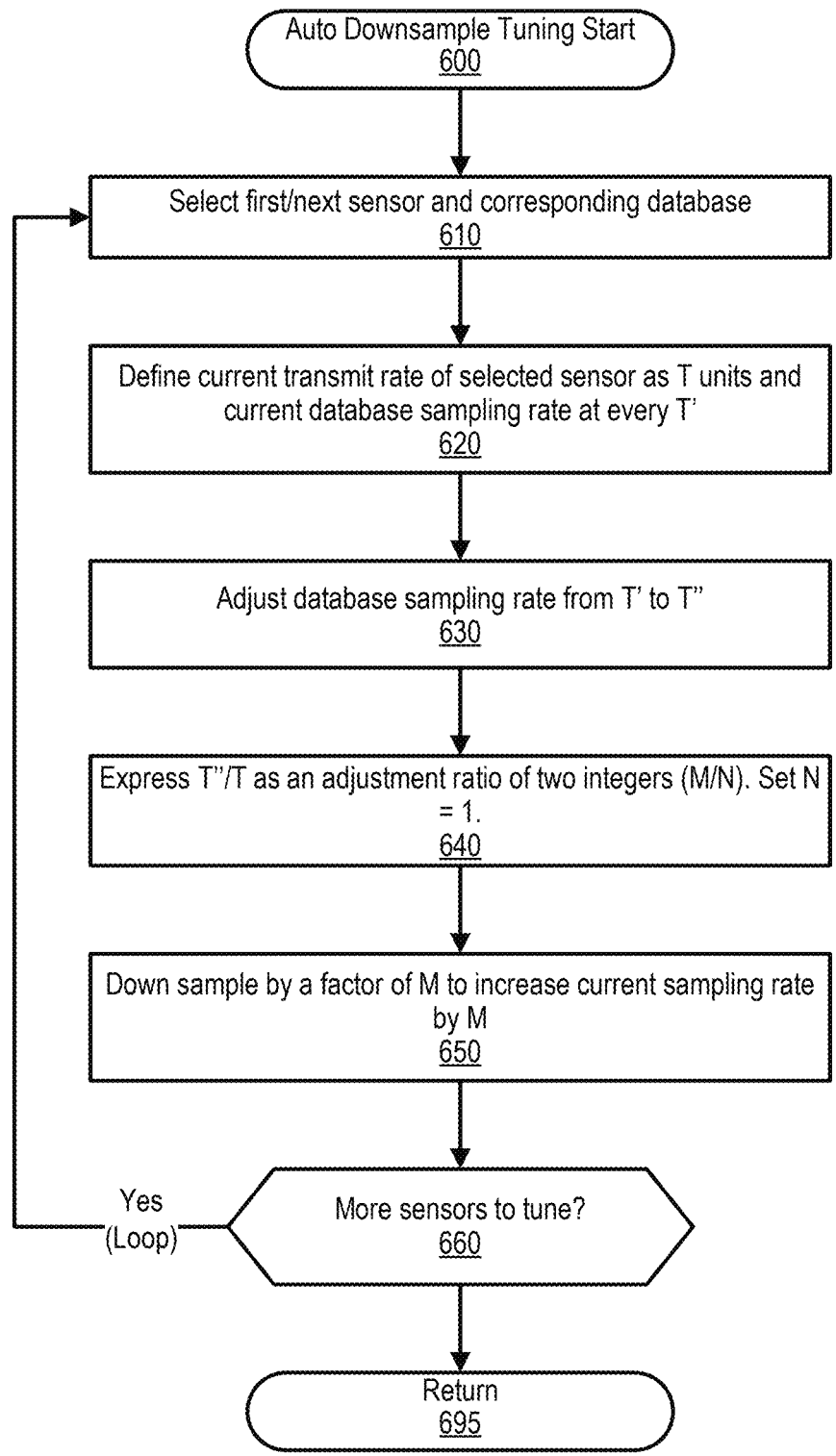
FIG. 6 is an exemplary flowchart depicting steps taken to auto downsample to tune sampling frequencies using the recycle bin.

At predefined process 450, in one embodiment, the process auto downsamples to tune the sampling frequencies using the recycle bin (see FIG. 6 and corresponding text for processing details). The process determines as to whether the trained model's accuracy is within a desired range (decision 460). In one embodiment, the process uses baseline models and benchmarking models as a nominal range to determine whether the accuracy is within a desired range.

If the trained model's accuracy is not within a desired range, then decision 460 branches to the 'no' branch which loops back to continue to auto downsample to tune the sampling frequencies using the recycle bin. This looping continues until the trained model's accuracy is within a desired range, at which point decision 460 branches to the 'no' branch exiting the loop.

At step 470, when a suitable set of sampling frequencies for each of the databases is found, the process instructs the sensors to re-tune their transmit frequencies accordingly. FIG. 4 processing thereafter ends at 495.

FIG. 5 is an exemplary flowchart depicting steps taken by an IoT analytics engine to learn a model and forecast for an event. FIG. 5 processing commences at 500 whereupon, at step 510, the process retrieves data stored in databases (e.g., DB X 345, DB Y 355, etc.). At step 520, the process leverages the retrieved data to learn a machine learning model to forecast for an event "X" where function $f$ is $A=f(DB1, DB2, \ldots DBn)$ and raise a flag in case of an anomaly.

At step 540, the process assigns data from each database a function of various hyper parameters that includes a sampling frequency after which incoming data is sampled. At step 550, the process tunes hyper parameters to arrive at a set of S1', S2', . . . . Sn' for which the anomaly lies within the desired range.

At step 560, the process models forecasts for event 'X' and raises a flag when an anomaly is detected. FIG. 5 processing thereafter returns to the calling routine (see FIGS. 5 and 8) at 595.

FIG. 6 is an exemplary flowchart depicting steps taken to auto downsample to tune sampling frequencies using the recycle bin. FIG. 6 processing commences at 600 whereupon, at step 610, the process selects a first sensor and corresponding database. At step 620, the process defines the current transmit frequency of the selected sensor as T units and current database sampling frequency at every S. At step 630, the process adjusts the database sampling frequency from S to S'.

At step 640, the process expresses S'/T as a ratio of two integers (M/N) and sets N=1. At step 650, the process down samples by a factor of M to increase the current sampling frequency by M times. The process determines as to whether there are more sensors to tune (decision 660). If there are more sensors to tune, then decision 660 branches to the 'yes' branch which loops back to select and tune the next sensor. This looping continues until there are no more sensors to tune, at which point decision 660 branches to the 'no' branch exiting the loop. FIG. 6 processing thereafter returns to the calling routine (see FIG. 4) at 695.

Figure 7:
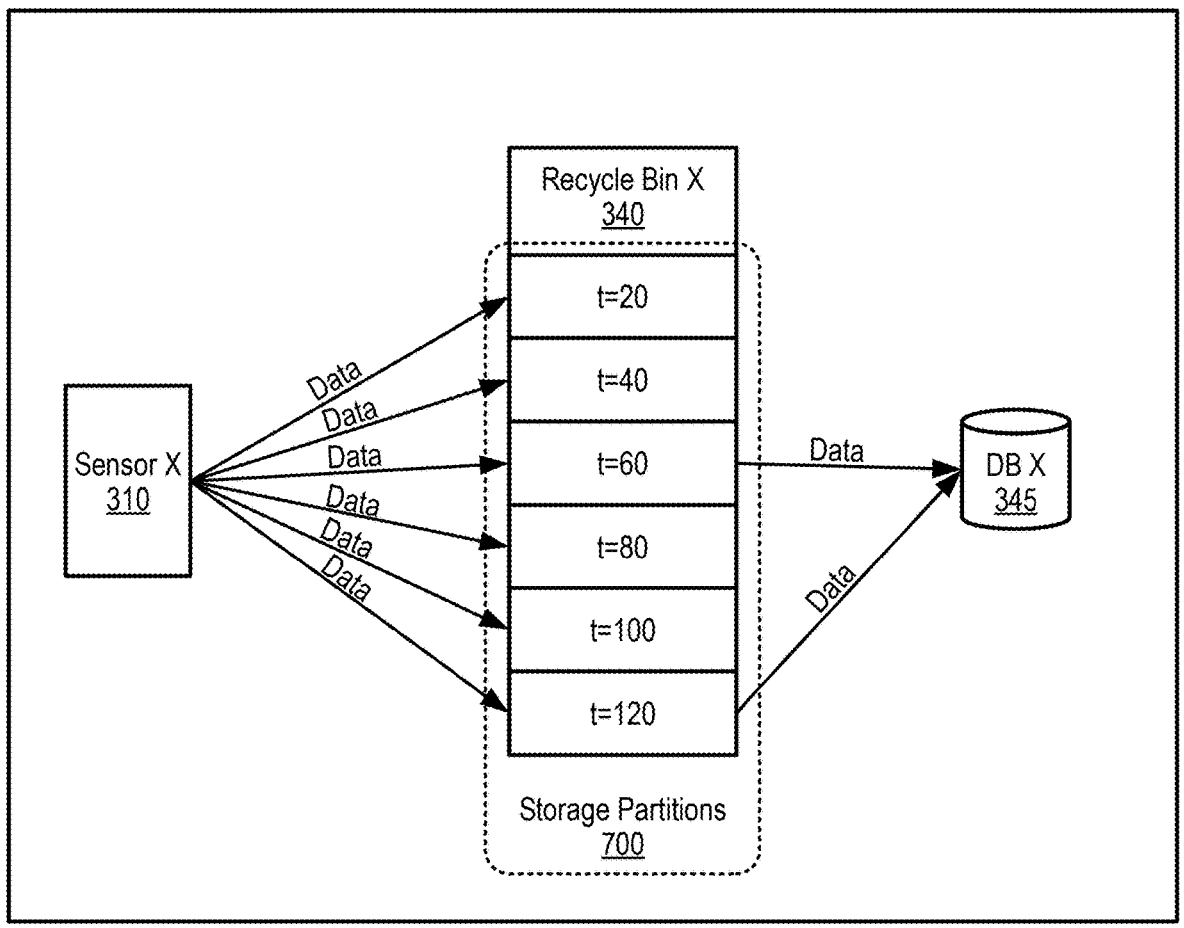
FIG. 7 is an exemplary diagram depicting an IoT analytics engine downsampling using a recycle bin to train a machine learning model.

FIG. 7 is an exemplary diagram depicting an IoT analytics engine downsampling using a recycle bin to train a machine learning model. FIG. 7 shows an example where sensor X 310's transmit frequency is initially T=20 seconds and database X 345's sampling frequency is S=60 seconds. As such, sensor x 310 sends data at every 20 seconds that gets stacked in recycle bin X 340's storage partitions 700. Each of storage partitions 700 corresponds to a timing interval (every 20 seconds), and FIG. 7 shows that sensor X 310's data is stored in each storage partition because the transmit frequency is the same as the storage partition timing interval.

Database X 345 samples from storage partitions 700 at the sampling frequency (every 60 seconds) to train the machine learning model. Assuming the sampling accuracy of S=60 seconds causes the machine learning model to degrade, IoT analytics engine 370 reduces the sampling frequency to S=40 seconds. Since recycle bin X 340 stores the packets in 20 second intervals, IoT analytics engine 370 can easily adjust the sampling frequency in intervals of 20 seconds (60 seconds to 40 seconds and retrain the machine learning model. Traditional systems do not provide this flexibility because the traditional systems to not use recycle bins to store different intervals of sample data.

IoT analytics engine 370 continuously performs the downsampling process discussed above until the trained machine learning model's accuracy lies within the desired range. Intuitively, the machine learning model is searching for a sampling frequency space that is less than the current sampling frequency where the reconstructed analog signal effectively captures the trends and leading to improved accuracy.

Once the desired hyper parameter space is found (e.g., appropriate downsampled frequencies), IoT analytics engine 370 monitors the accuracy for some time to ensure a steady state is achieved. Then, IoT analytics engine 370 instructs sensor X 310 to update its transmit frequency in accordance with database X 345's sampling frequency.

Figure 8:
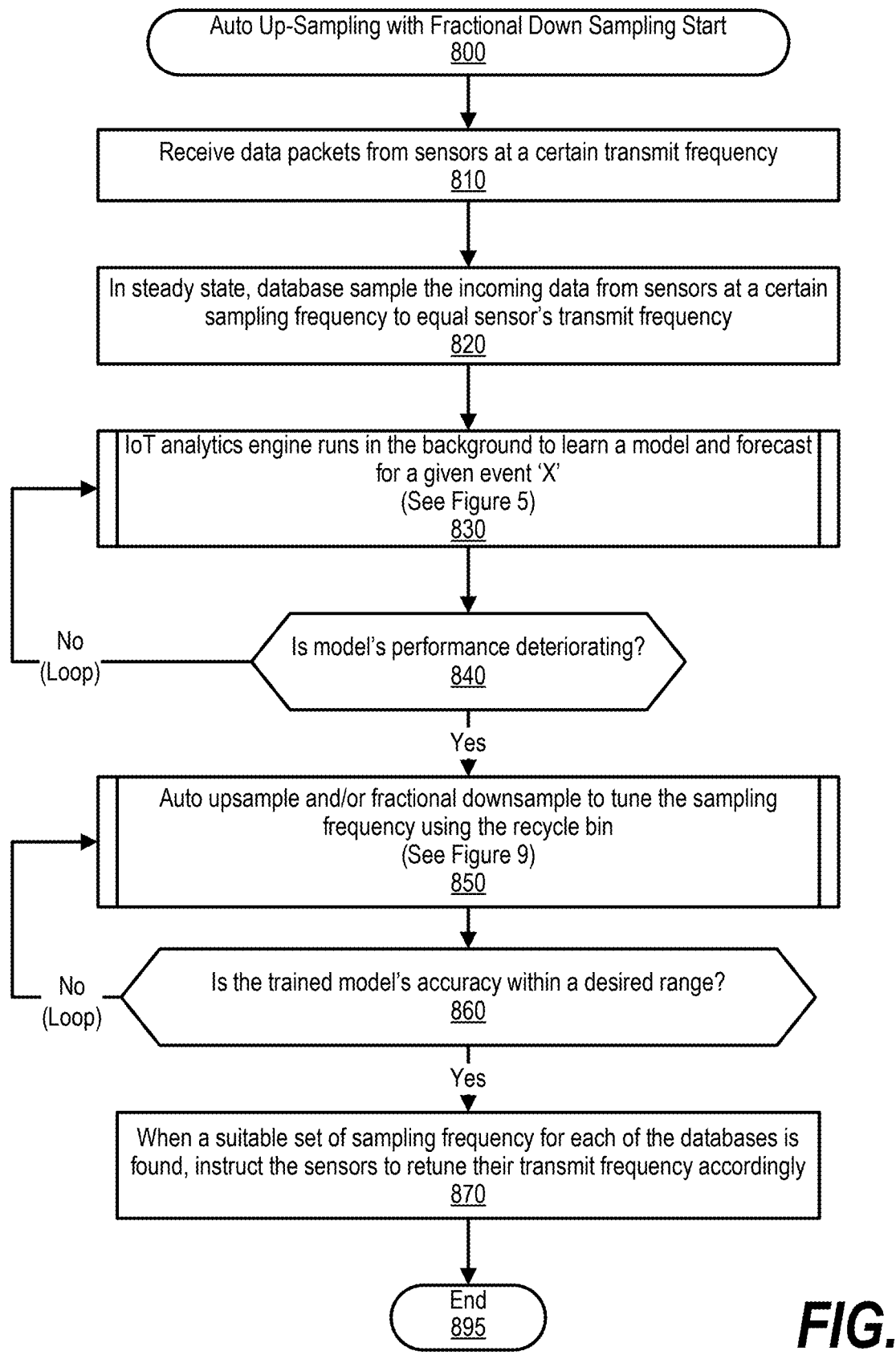
FIG. 8 is an exemplary flowchart depicting steps taken to auto upsample with fractional down sample an IoT analytics system via cached recycle bins.

FIG. 8 is an exemplary flowchart depicting steps taken to auto up-sample with fractional down sample an IoT analytics system via cached recycle bins. FIGS. 8 through 11 pertain to an embodiment where IoT analytics engine 370 supports upsampling and fractional downsampling in situations when the new sampling frequency is not an integer multiple of the current sampling frequency. The embodiment selects sampling frequencies from both sides of the spectrum (upsampled and fractional downsampled frequencies) such that IoT analytics engine 370 overcomes an inherent limitation of missing data in the cached recycle bins (see FIGS. 10, 11, and corresponding text for further details).

FIG. 8 processing commences at 800 whereupon, at step 810, the process receives data from sensors at a certain transmit frequency (upstream stage). At step 820, the process, in a steady state, database samples the incoming data from sensors at a certain frequency to equal the sensor's transmit frequency.

At predefined process 830, the process runs in the background to learn a model and forecast for a given event 'X' (see FIG. 5 and corresponding text for processing details). The process determines as to whether the model's performance is deteriorating (decision 840). If the model's performance is not deteriorating, then decision 840 branches to the 'no' branch which loops back to continue to learn the machine learning model and forecast for a given event 'X'. This looping continues until the model's performance deteriorates, at which point decision 840 branches to the 'yes' branch exiting the loop.

Figure 9:
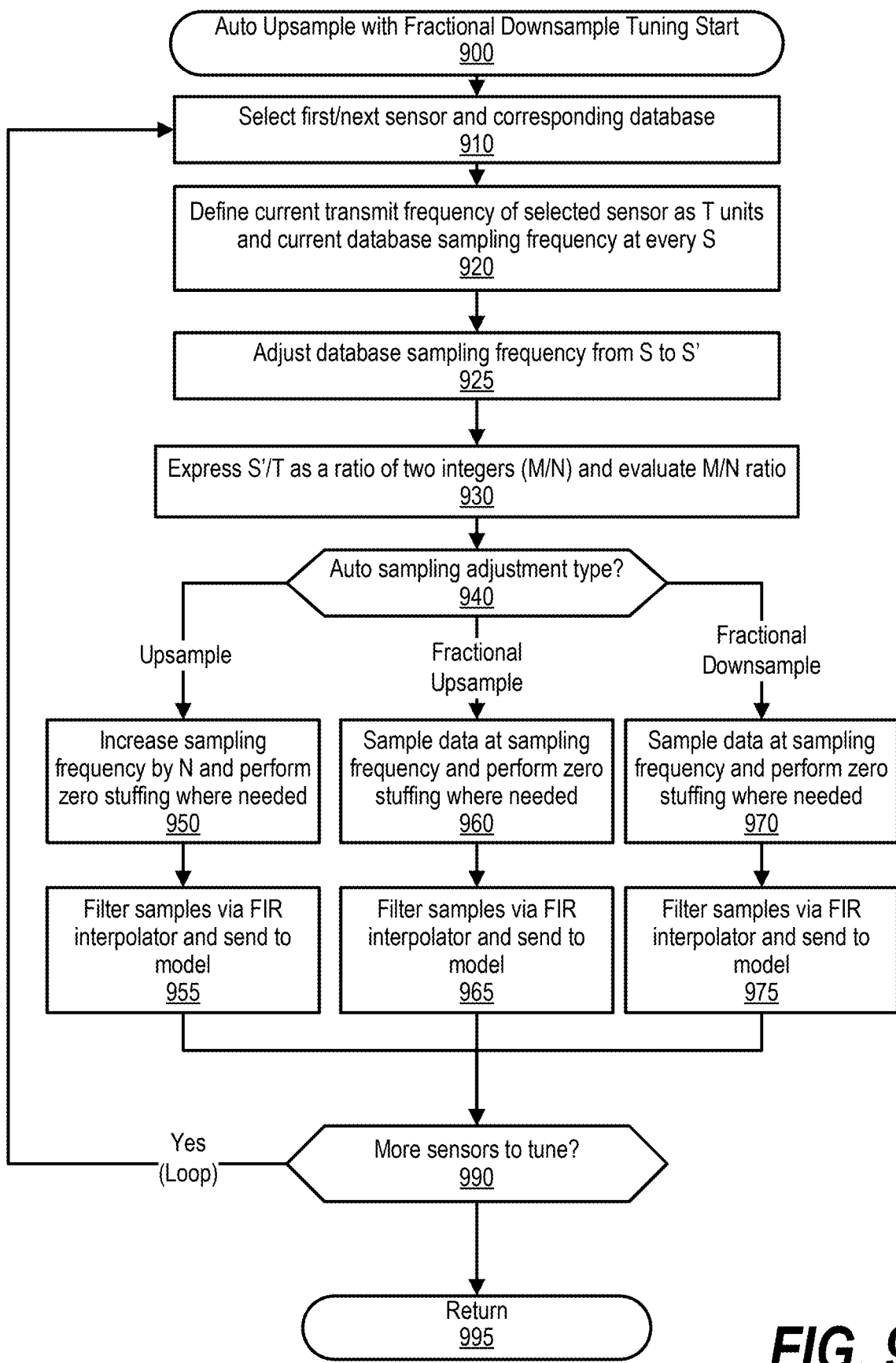
FIG. 9 is an exemplary flowchart depicting steps taken to upsample with fractional downsample to tune the sampling frequencies using the recycle bin.

At predefined process 850, the process auto upsamples and/or fractional downsamples to tune the sampling frequencies using the recycle bin (see FIG. 9 and corresponding text for processing details). The process determines as to whether the trained model's accuracy is within a desired range (decision 860). If the trained model's accuracy is not within a desired range, then decision 860 branches to the 'no' branch which loops back to continue to auto upsample and/or fractional downsample to tune the sampling frequencies using the recycle bin. This looping continues until the trained model's accuracy is within a desired range, at which point decision 860 branches to the 'yes' branch exiting the loop.

At step 870, when a suitable set of sampling frequencies for each of the databases is found, the process relays the signal to sensors to retune their corresponding transmit frequencies. FIG. 8 processing thereafter ends at 895.

FIG. 9 is an exemplary flowchart depicting steps taken to upsample with fractional downsample to tune the sampling frequencies using the recycle bin. FIG. 9 processing commences at 900 whereupon, at step 910, the process selects a first sensor and corresponding database. At step 920, the process defines a current transmit frequency of selected sensor as T units and current database sampling frequency at every S. At step 925, the process adjusts the database sampling frequency from S to S'.

At step 930, the process expresses S'/T as a ratio of two integers (M/N) and evaluates the M/N ratio. The process determines an auto sampling adjustment type based on the ratio (decision 940). In one embodiment, the process uses the following criteria to determine the adjustment type:

Pure upsampling when the transmit frequency (T) is an integer multiple of the adjusted sampling frequency (S')

Fractional upsampling when the transmit frequency (T) is not integer multiple of the adjusted sampling frequency (S')

Fractional downsampling when the adjusted sampling frequency (S') is not integer multiple of the transmit frequency (T)

Figure 10:
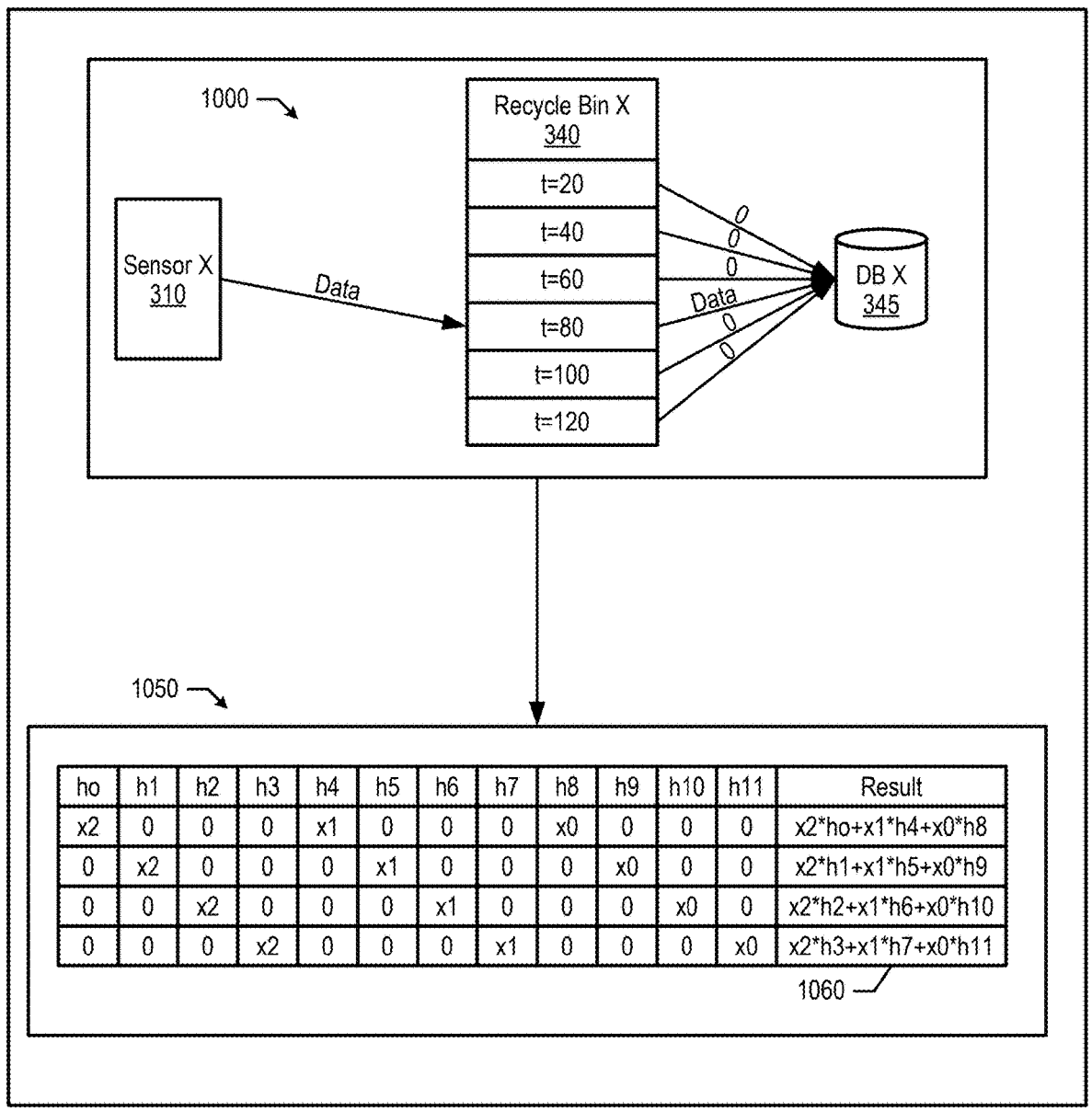
FIG. 10 is an exemplary diagram depicting an IoT analytics engine upsampling using a recycle bin to train a machine learning model.

If the auto sampling adjustment type is to upsample, then decision 940 branches to the 'upsample' branch whereupon, at step 950, the process increases the sampling frequency by N and performs zero stuffing where needed to generate a training dataset (see FIG. 10 and corresponding text for further details). At step 955, the process filters the training data set via the FIR interpolator and sends the filtered training data set to the machine learning model.

Figure 11:
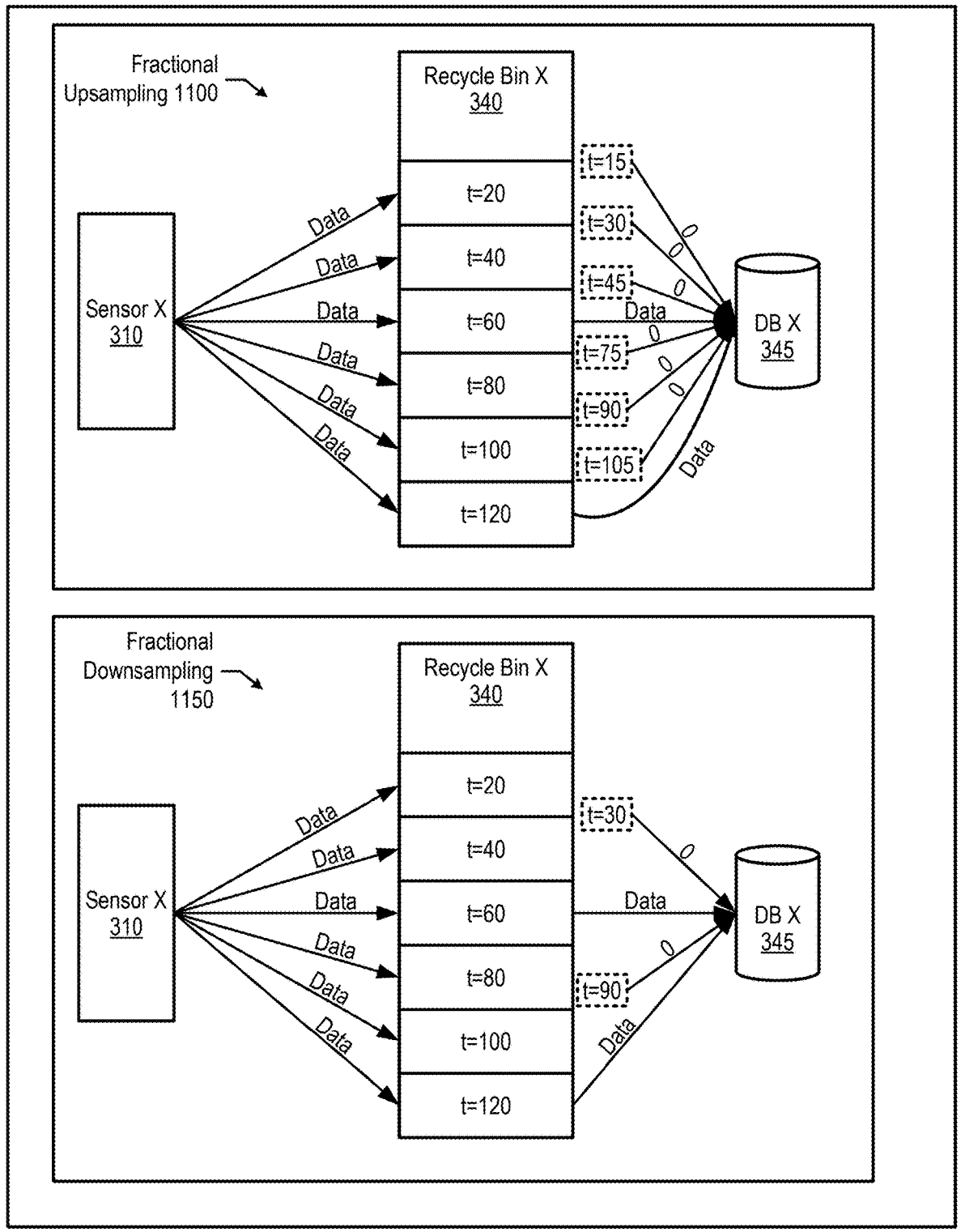
FIG. 11 is an exemplary diagram depicting an IoT analytics engine performing fractional upsampling and fractional downsampling.

On the other hand, if the auto sampling adjustment type is to fractional up sample, then decision 940 branches to the 'fractional upsample' branch whereupon, at step 960, the process samples the data from the cached recycle bin and performs zero stuffing where needed to generate a training data set (see FIG. 11, diagram 1100 and corresponding text for further details). At step 965, the process filters the training data set via the FIR interpolator and sends the filtered training data set to the machine learning model.

On the other hand, if the auto sampling adjustment type is to fractional down sample, then decision 940 branches to the 'fractional downsample' branch whereupon, at step 970, the process samples the data from the cached recycle bin and performs zero stuffing where needed to generate the training data set (see FIG. 11, diagram 1150 and corresponding text for further details). At step 975, the process filters the training data set via the FIR interpolator and sends the filtered training data set to the machine learning model and sends the filtered training data set to the machine learning model.

The process determines as to whether there are more sensors to tune (decision 990). If there are more sensors to tune, then decision 990 branches to the 'yes' branch which loops back to select and tune the next sensor. This looping continues until there are no more sensors to tune, at which point decision 990 branches to the 'no' branch exiting the loop. FIG. 9 processing thereafter returns to the calling routine (see FIG. 8) at 995.

FIG. 10 is an exemplary diagram depicting an IoT analytics engine upsampling using a recycle bin to train a machine learning model. Diagram 1000 shows an example where sensor X 310's transmit frequency is initially T=80 seconds and database X 345's sampling frequency is S=20 seconds. As such, sensor X 310 sends data at every 80 seconds that gets stacked in recycle bin X 340's storage partition corresponding to t=80.

Database X 345 samples from recycle bin X 340 at every 20 seconds to train the machine learning model. As can be seen, for t=20, t=40, t=60, t=100 sec, database X 345 does not find any data in recycle bin X 340. As such, IoT analytics engine 370 performs "zero stuffing" that, when IoT analytics engine 370 increases the sampling frequency by N, IoT analytics engine 370 stuffs (N−1) zeros as shown in FIG. 10. Zero stuffing adds extra spectral images that are eventually filtered using FIR interpolator filtering techniques. This approach ensures that as database X 345 changes its sampling frequency, it leverages the persistent data to train the machine learning model in accordance with the new sampling frequency and improves the accuracy of the machine learning model.

Diagram 1050 shows a table that includes results from the FIR interpolator. The table is based on a 12-tap FIR interpolator whose coefficients are h0-h11 and IoT analytics engine 370 implements the interpolation by a factor of 4. The three data samples, x0-x2 (with the latest on the far left) have entered the FIR interpolator's delay line where x0-x2 correspond to the sampled time instances e.g.: t=80 sec, 160 sec. As can be seen, results 1060 remove the zero stuffing values.

Once the desired hyper parameter space is found (e.g., appropriate downsampled frequencies), IoT analytics engine 370 monitors the accuracy for some time to ensure a steady state is achieved. Then, IoT analytics engine 370 relays the information to sensor X 310 to update its transmit frequency in accordance with database X 345's sampling frequency.

FIG. 11 is an exemplary diagram depicting an IoT analytics engine performing fractional upsampling and fractional downsampling. Fractional upsampling 1100 shows an example where sensor X 310's transmit frequency is initially T=20 seconds and database X 345's sampling frequency is S=15 seconds. As such, sensor x 310 sends data at every 20 seconds that gets stacked in recycle bin X 340's storage partitions.

Database X 345 samples from recycle bin X 340 at every 15 seconds to train the machine learning model. As discussed above, IoT analytics engine 370 performs zero stuffing where needed and uses the FIR interpolator to filter out the zeros. For time steps that equal the least common multiple of T and S and its integers (every 60 seconds), database X 345 is able to sample from recycle bin X 340's storage partitions. For the rest of the sampling points, IoT analytics engine 370 performs zero stuffing (e.g., stuff with $\{(LCM/S)-1\}$ zeros. Fractional upsampling 1100 shows $\{(60/15)-1\}=4-1=3$ zeros per interval. This approach ensures that as database X 345 changes its sampling frequency, it leverages the persistent data to train the machine learning model in accordance with the new sampling frequency and improves the accuracy of the machine learning model.

Once the desired hyper parameter space is found (e.g., appropriate downsampled frequencies), IoT analytics engine 370 monitors the accuracy for some time to ensure a steady state is achieved. Then, IoT analytics engine 370 instructs sensor X 310 to update its transmit frequency in accordance with database X 345's sampling frequency.

Fractional downsampling 1150 shows an example where sensor X 310's transmit frequency is initially T=20 seconds and database X 345's sampling frequency is S=30 seconds. As such, sensor x 310 sends data at every 20 seconds that gets stacked in recycle bin X 340's corresponding storage partitions.

Database X 345 samples from recycle bin X 340 at every 30 seconds to train the machine learning model. Similar to fractional upsampling 1100, for the time steps that equal the least common multiple of T and S and its integers (every 60 seconds), database X 345 samples from recycle bin X 340. For the rest of the sampling points IoT analytics engine 370 performs zero stuffing (e.g., stuff with $\{(LCM/S)-1\}$ zeros. Fractional downsampling 1150 shows $\{(60/30)-1\}=2-1=1$ zero per interval. This approach ensures that as database X 345 changes its sampling frequency, it leverages the persistent data to train the machine learning model in accordance with the new sampling frequency and improves the accuracy of the machine learning model.

Once the desired hyper parameter space is found (e.g., appropriate downsampled frequencies), IoT analytics engine 370 monitors the accuracy for some time to ensure a steady state is achieved. Then, IoT analytics engine 370 instructs sensor X 310 to update its transmit frequency in accordance with database X 345's sampling frequency.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
    storing, in a cached recycle bin, a set of sensor data that is sent from a sensor at a transmit frequency;
    sampling at least a portion of the set of sensor data from the cached recycle bin based on a sampling frequency and training a machine learning model using the sampled data;
    in response to detecting that a performance of the machine learning model falls below a threshold during the training, adjusting the sampling frequency and re-sampling at least a portion of the sensor data based on the adjusted sampling frequency;
    instructing the sensor to adjust the transmit frequency in response to determining that the performance of the machine learning model reaches the threshold using the re-sampled data;
    formulating an adjustment ratio by dividing the adjusted sampling frequency by the transmit frequency; and
    determining an adjustment type based on the adjustment ratio, wherein the adjustment type is determined by the following steps:
    determining that the adjustment type is an upsample adjustment by detecting that the transmit frequency is an integer multiple of the adjusted sampling frequency and in response increasing the sampling frequency; or that the adjustment type is one of a fractional upsample or a fractional downsample adjustment based on the detecting that the transmit frequency is not an integer multiple of the adjusted sampling frequency;
        generating a training data set by sampling the set of sensor data based on the adjusted or increased sampling frequency and zero stuffing at least a portion of the training data set where the transmit frequency is not an integer multiple of the adjusted sampling frequency;
        filtering the training data set using a finite impulse response (FIR) interpolator on the training data set; and
        training the machine learning using the training data set.

2. The computer-implemented method of claim 1 wherein the cached recycle bin comprises a plurality of storage partitions corresponding to a plurality of timing intervals, and wherein storing the set of sensor data further comprises:
    matching the transmit frequency to one or more of the plurality of timing intervals;
    storing the set of sensor data in a first set of the plurality of storage partitions that correspond to the matched timing intervals;
    identifying one or more of the plurality of timing intervals that are an integer multiple of the sampling frequency; and
    sampling from a second set of the plurality of storage partitions that correspond to the identified on or more timing intervals.

3. The computer-implemented method of claim 1 further comprising:
    instructing the sensor to adjust the transmit frequency based on the adjustment ratio.

4. The method of claim 1,
    wherein the set of sensor data is sampled from one or more of a plurality of bin locations.

5. An information handling system comprising:
    one or more processors;
    a memory coupled to at least one of the processors;
    a set of computer program instructions stored in the memory and executed by at least one of the processors in order to perform actions of:
        storing, in a cached recycle bin, a set of sensor data that is sent from a sensor at a transmit frequency;
        sampling at least a portion of the set of sensor data from the cached recycle bin based on a sampling frequency and training a machine learning model using the sampled data;
        in response to detecting that a performance of the machine learning model falls below a threshold during the training, adjusting the sampling frequency and re-sampling at least a portion of the sensor data based on the adjusted sampling frequency;
        instructing the sensor to adjust the transmit frequency in response to determining that the performance of the machine learning model reaches the threshold using the re-sampled data;
        formulating an adjustment ratio by dividing the adjusted sampling frequency by the transmit frequency; and
        determining an adjustment type based on the adjustment ratio, wherein the adjustment type is determined by the following steps:
        determining that the adjustment type is an upsample adjustment by detecting that the transmit frequency is an integer multiple of the adjusted sampling frequency and in response increasing the sampling frequency; or that the adjustment type is one of a fractional upsample or a fractional downsample adjustment based on the detecting that the transmit frequency is not an integer multiple of the adjusted sampling frequency;
            generating a training data set by sampling the set of sensor data based on the adjusted or increased sampling frequency and zero stuffing at least a portion of the training data set where the transmit frequency is not an integer multiple of the adjusted sampling frequency;
            filtering the training data set using a finite impulse response (FIR) interpolator on the training data set; and training the machine learning using the training data set.

6. The information handling system of claim 5 wherein the cached recycle bin comprises a plurality of storage partitions corresponding to a plurality of timing intervals, and wherein the processors perform additional actions comprising:
matching the transmit frequency to one or more of the plurality of timing intervals;
storing the set of sensor data in a first set of the plurality of storage partitions that correspond to the matched timing intervals;
identifying one or more of the plurality of timing intervals that are an integer multiple of the sampling frequency; and
sampling from a second set of the plurality of storage partitions that correspond to the identified one or more timing intervals.

7. The information handling system of claim 5 wherein the processors perform additional actions comprising:
instructing the sensor to adjust the transmit frequency based on the adjustment ratio.

8. The information handling system of claim 5
wherein the set of sensor data is sampled from one or more of a plurality of bin locations.

9. A computer program product stored in a computer readable storage medium, comprising computer program code that, when executed by an information handling system, causes the information handling system to perform actions comprising:
storing, in a cached recycle bin, a set of sensor data that is sent from a sensor at a transmit frequency;
sampling at least a portion of the set of sensor data from the cached recycle bin based on a sampling frequency and training a machine learning model using the sampled data;
in response to detecting that a performance of the machine learning model falls below a threshold during the training, adjusting the sampling frequency and re-sampling at least a portion of the sensor data based on the adjusted sampling frequency;
instructing the sensor to adjust the transmit frequency in response to determining that the performance of the machine learning model reaches the threshold using the re-sampled data;
formulating an adjustment ratio by dividing the adjusted sampling frequency by the transmit frequency; and
determining an adjustment type based on the adjustment ratio, wherein the adjustment type is determined by the following steps:
determining that the adjustment type is an upsample adjustment by detecting that the transmit frequency is an integer multiple of the adjusted sampling frequency and in response increasing the sampling frequency; or that the adjustment type is one of a fractional upsample or a fractional downsample adjustment based on the detecting that the transmit frequency is not an integer multiple of the adjusted sampling frequency;
generating a training data set by sampling the set of sensor data based on the adjusted or increased sampling frequency and zero stuffing at least a portion of the training data set where the transmit frequency is not an integer multiple of the adjusted sampling frequency;
filtering the training data set using a finite impulse response (FIR) interpolator on the training data set; and
training the machine learning using the training data set.

10. The computer program product of claim 9 wherein the cached recycle bin comprises a plurality of storage partitions corresponding to a plurality of timing intervals, wherein the information handling system performs further actions comprising:
matching the transmit frequency to one or more of the plurality of timing intervals;
storing the set of sensor data in a first set of the plurality of storage partitions that correspond to the matched timing intervals;
identifying one or more of the plurality of timing intervals that are an integer multiple of the sampling frequency; and
sampling from a second set of the plurality of storage partitions that correspond to the identified one or more timing intervals.

11. The computer program product of claim 9
wherein the set of sensor data is sampled from one or more of a plurality of bin locations.

* * * * *